United States Patent [19]
McLeod

[11] Patent Number: 5,922,255
[45] Date of Patent: Jul. 13, 1999

[54] METHOD OF MANUFACTURING A RACKET FRAME AND THROAT

[75] Inventor: Gary McLeod, San Diego, Calif.

[73] Assignee: Highlander Sports, LLC, San Diego, Calif.

[21] Appl. No.: 08/833,187

[22] Filed: Apr. 4, 1997

[51] Int. Cl.$^6$ ..................................................... B29C 45/18

[52] U.S. Cl. ................ 264/40.1; 264/328.8; 264/328.12; 473/535

[58] Field of Search ................................... 264/40.1, 40.5, 264/328.1, 328.8, 328.12; 425/573; 473/524, 535, 537, 536

[56] References Cited

U.S. PATENT DOCUMENTS

| | | |
|---|---|---|
| 3,981,504 | 9/1976 | Gugel . |
| 4,180,263 | 12/1979 | Haines . |
| 4,294,787 | 10/1981 | Lo . |
| 4,297,308 | 10/1981 | Popplewell . |
| 4,310,157 | 1/1982 | Greenberg . |
| 4,340,226 | 7/1982 | Haines . |
| 4,343,757 | 8/1982 | Popplewell . |
| 4,420,452 | 12/1983 | Van Dalen et al. ............... 264/328.12 |
| 4,440,392 | 4/1984 | Popplewell . |
| 4,643,857 | 2/1987 | Cousin et al. . |
| 4,874,570 | 10/1989 | Haines . |
| 4,891,175 | 1/1990 | Haines . |
| 4,935,185 | 6/1990 | Mott . |
| 4,981,639 | 1/1991 | Mott . |
| 5,009,422 | 4/1991 | Soong . |
| 5,013,513 | 5/1991 | Schad et al. ......................... 264/328.8 |
| 5,071,124 | 12/1991 | Davis . |
| 5,152,526 | 10/1992 | Soong . |
| 5,419,554 | 5/1995 | Krone et al. . |
| 5,423,533 | 6/1995 | Hsu . |
| 5,507,486 | 4/1996 | Miyamoto . |
| 5,540,877 | 7/1996 | Repetto et al. . |
| 5,551,689 | 9/1996 | Svoma et al. . |
| 5,556,582 | 9/1996 | Kazmer ................................. 264/40.1 |

*Primary Examiner*—Jill L. Heitbrink
*Attorney, Agent, or Firm*—Gregory Garmong

[57] ABSTRACT

A racket frame and throat unit is prepared by injection molding using a mold with a mold cavity defining the oval frame and the throat. The method includes first injecting a first quantity of a fiber-reinforced thermoplastic resin into a first injection port at an end of the mold cavity remote from the throat, and second injecting a second quantity of the fiber-reinforced thermoplastic resin into a second injection port in the throat region. The step of second injecting is commenced at a time after the step of first injecting is commenced, typically 1–2 seconds after the first step is commenced. The frame is solid, with a central solid body at a planar centerline of the frame, and two solid arms extending outwardly from the solid body at an angle to the planar centerline of the frame of from about 70 degrees to about 80 degrees, one arm above and one arm below the planar centerline of the frame. There is preferably an oval hoop at a distal end of each of the solid arms.

18 Claims, 4 Drawing Sheets

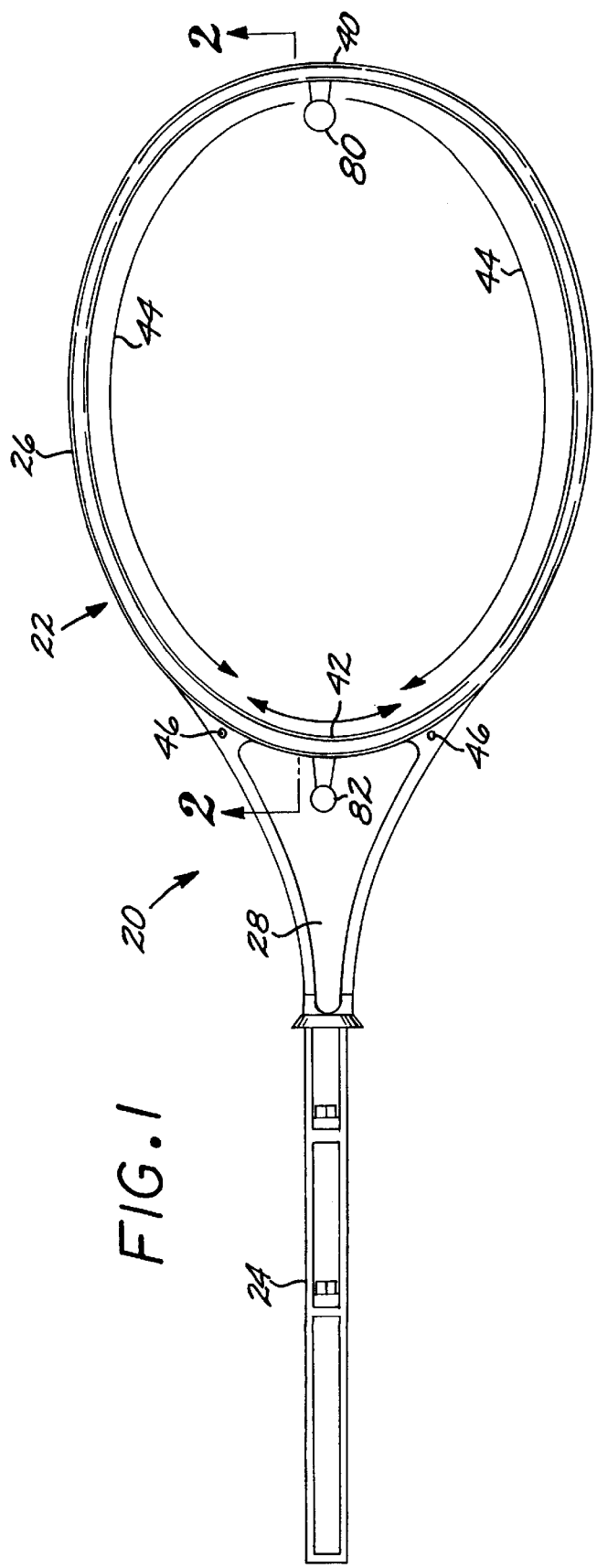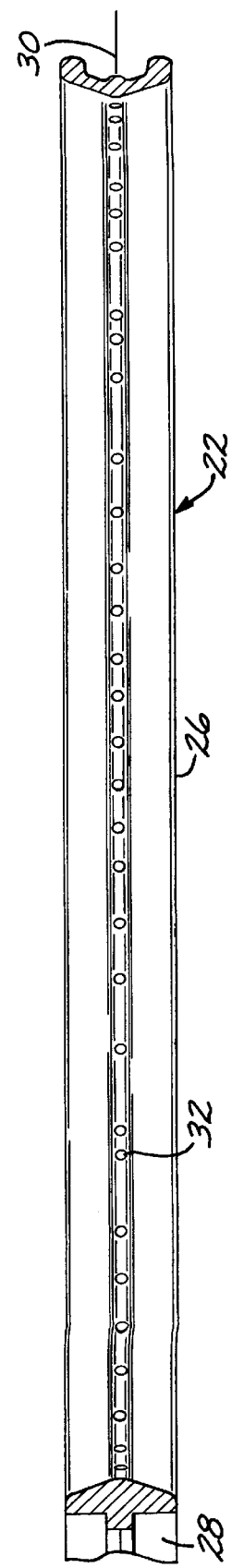
FIG.1
FIG.2

METHOD OF MANUFACTURING A RACKET FRAME AND THROAT

BACKGROUND OF THE INVENTION

This invention relates to rackets such as tennis rackets, and, more particularly, to the manufacture of rackets by injection molding of fiber-reinforced thermoplastic resins.

Racket sports, such as tennis, racketball, badminton, and squash, each utilize a racket with which a ball or other object is struck. Each of these types of rackets includes a head formed of a generally oval frame with strings supported thereon, a handle, and a throat that provides a transition between the handle and the head. The size and weight of the racket is tailored to the specific racket sport and the characteristics of the player.

In recent years, considerable effort has been devoted to improving both designs of the rackets and the materials of construction. Designs have been changed to increase the area of the racket head where the most satisfactory impact is achieved, the "sweet spot". Racket frames were traditionally made of wood or metal. More recently, fiber-reinforced composite materials have been used to form the frames of advanced rackets, providing improved strength and durability.

Although the available rackets have good performance, several problems remain. One is that the cost of advanced rackets is relatively high. Quality rackets generally retail for over $100, which places them in a price range above that which many persons and institutions such as schools can afford. Another is that high performance racket frames have not been optimized for fabrication from low-cost, recyclable materials. Tennis rackets, for example, must achieve satisfactory static and dynamic impact performance with a weight constrained to about 9–12 ounces, and also must be suitably robust for repeated use.

Thus, there is a need for even further improvements in the design and manufacturability of low-cost, high performance rackets. The present invention fulfills this need, and further provides related advantages.

SUMMARY OF THE INVENTION

The present invention provides a method for manufacturing a racket. The materials of construction and the manufacturing process are inexpensive. The final product has excellent strength, without lines of weakness in the frame/throat region due to the single-step manufacturing operation. The racket frame is durable, as there are no thin walls or sections such as found in hollow tubular frames.

The present inventor has determined that performance comparable with more costly rackets may be achieved in rackets made using low-cost materials and an optimized cross-sectional geometry. Over the years, many attempts have been made to produce a low-cost thermoplastic racket. However, the integrity of the glass-filled thermoplastic materials was limited by nonuniform glass fiber distributions within the racket frame. Specifically, the glass fibers did not cross flow fronts during the injection molding process. The present invention solves this problem through the use of a manufacturing process and optimized design wherein the flow front is eliminated through the use of a mixing flow chamber. The implementation of this design eliminates the typical weak link weld lines which have been present in previous plastic rackets. The elimination of weld lines permits the design and performance of the racket to be optimized for the use of low-cost fiber-reinforced thermoplastic compounds.

In accordance with one embodiment of the invention, a method for preparing a racket frame and throat comprises the steps of furnishing an injection mold having a mold cavity defining the shape of a racket frame and throat. The mold cavity includes an oval frame region having a first end and a second end, a throat region integral with the second end of the oval frame region, a first injection port at the first end, and a second injection port in the throat region. The injection molding process consists of first injecting a first quantity of a first fiber-reinforced thermoplastic resin into the first injection port, and second injecting a second quantity of a second fiber-reinforced thermoplastic resin into the second injection port. In most cases, the same fiber-reinforced thermoplastic resin is used for both the first injecting and the second injecting. The first quantity and the second quantity are together sufficient to fill the mold cavity.

The step of second injecting is commenced at a time after the step of first injecting is commenced. The determination of the time to start the second injecting is preferably made by providing a mold cavity having a pressure sensor at a location at which the oval frame region joins the throat region. During the injection molding operation, the pressure sensor is monitored, and the step of second injecting is commenced when the pressure measured by the pressure sensor rises to indicate that the first fiber-reinforced thermoplastic resin has flowed along the oval frame region of the mold cavity and reached the pressure sensor. This time is typically from about 1 to about 2 seconds after the step of first injecting is commenced, for a standard-size tennis racket. Equivalently, the mixing may be accomplished by delay timing the opening of the second injection port, based upon observations of the flow in prototype production.

This manufacturing approach results in an integral frame and throat, in which there are no lines of weakness. During injection molding, the two flows of injected material intermix with a swirling movement in the throat region, which serves as a mixing flow chamber due to the delayed second injection. The result in that there is no weakened interface in the thinner frame region resulting from the meeting of two separate flows of injected material.

In another aspect of the invention, the cross section of the frame is optimized for good performance within a weight constraint. The cross-sectional shape has a central solid body at a planar centerline of the frame, and two solid arms extending outwardly from the solid body at an angle to the planar centerline of the frame of from about 70 degrees to about 80 degrees. One arm is above and one arm is below the planar centerline of the frame. A lobe is formed at the end of each of the arms. The lobe serves as an enlarged oval hoop at the end of each of the solid arms.

The present approach provides a racket having reduced cost and improved performance, as compared with other mass-produced rackets. Although a particular embodiment of the invention has been described in detail for purposes of illustration, various modifications and enhancements may be made without departing from the spirit and scope of the invention. Accordingly, the invention is not to be limited except as by the appended claims.

BRIEF DESCRIPTION OF THE DRAWINGS

FIG. 1 is a plan view of a tennis racket having a frame, a throat, and a handle;

FIG. 2 is an enlarged sectional view of the racket frame and throat of FIG. 1, taken along lines 2—2;

DETAILED DESCRIPTION OF THE INVENTION

Figure 3:
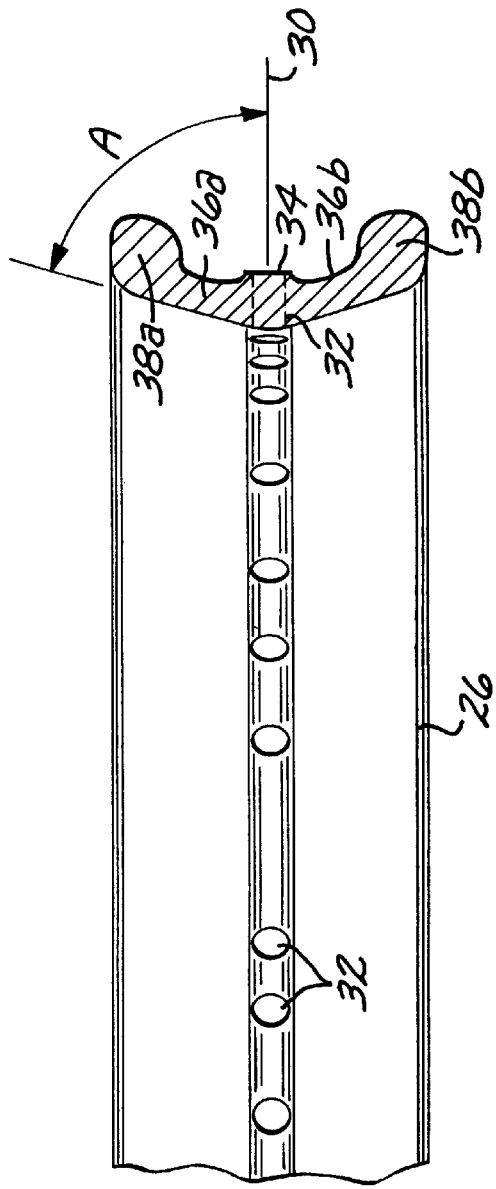
FIG. 3 is a detail of the cross section of the racket frame of FIG. 2.

FIGS. 1–3 depict a racket made according to the invention, in this case a preferred tennis racket 20. The racket 20 includes a head 22 and a handle 24. The head 22 has an oval frame 26 and a throat 28 that connects the frame 26 to the handle 24. FIG. 2 is a section through the frame 26 and throat 28. The frame 26 and throat 28 are generally symmetric about a planar centerline 30 of the racket 20. A series of holes 32 are provided for the stringing of the racket, but the strings are not shown in FIGS. 1–3 in order not to obscure the details of the racket structure. The strings may be made of any operable stringing material.

FIG. 2 and the detail of FIG. 3 illustrate the cross-sectional shape of the frame 26. The frame is solid, as distinct from circumferentially hollow. There are therefore no thin walls that are susceptible to breakage during normal use. Circumferentially hollow frame sections also lead to increased manufacturing cost and complexity, and are avoided here. The frame cross-sectional shape includes a central body 34, which is solid except for the holes 32 that penetrate radially therethrough. Two solid (as distinct from hollow) arms 36 extend outwardly from the solid body 34. A first arm 36a extends upwardly from the solid body 34, and a second arm 36b extends downwardly from the solid body 34. The arms are angled upwardly and downwardly, each by an angle A of from about 68 to about 78 degrees, most preferably about 72 degrees, from the planar centerline 30. The angle A is measured through an arc outward from the center of the racket frame when viewed in the view of FIGS. 2 and 3.

Preferably, each arm 36 has a lobe 38 at its distal (remote) end relative to the central body 34. There is a lobe 38a for the arm 36a, and a lobe 38b for the arm 36b. Each lobe is a rounded structure to minimize likelihood of damage when the racket is struck against an object such as the ground or a post during play. When considered in three dimensions, each lobe 38 forms an oval hoop around the circumference of the frame 26 that provides strengthening of the frame against bending in the direction perpendicular to the centerline 30. Stated alternatively, each lobe 38 places a maximum amount of the strengthening mass of the frame at a maximum practical distance from the centerline 30. The strengthening mass could conceivably be placed further from the centerline, but that would weaken the web section of the arm so that durability would be reduced.

Figure 4:
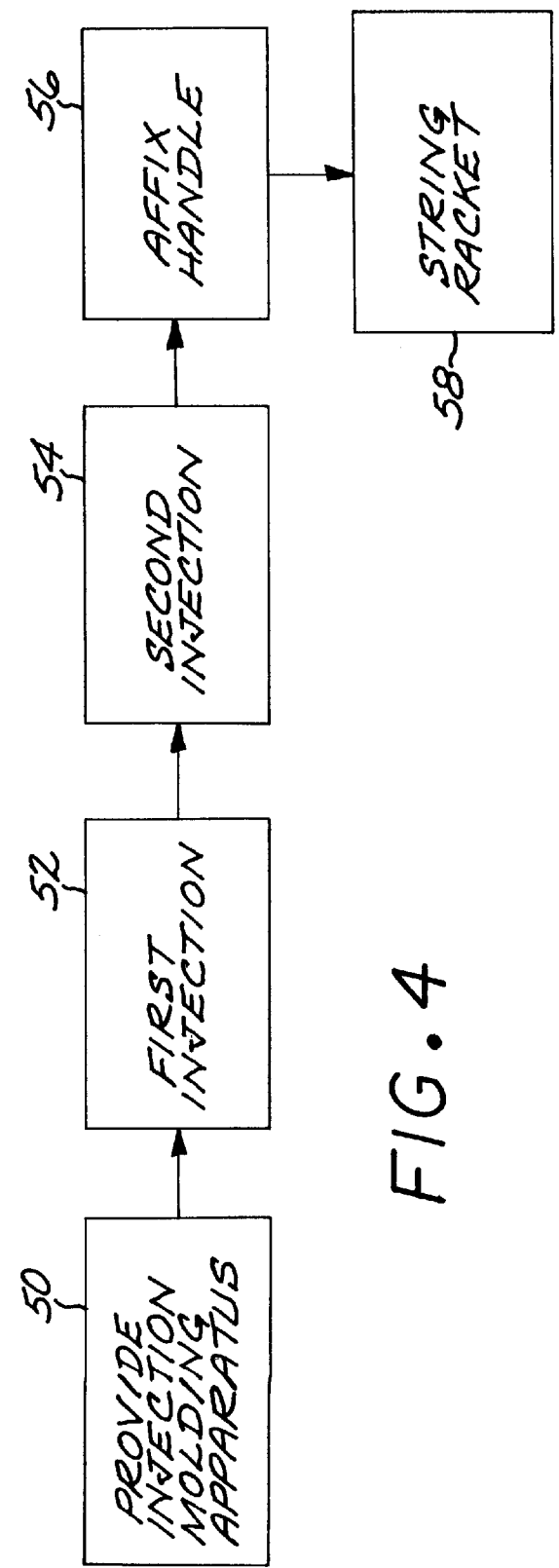
FIG. 4 is a block diagram of a method for preparing a tennis racket using the present approach.
Figure 5:
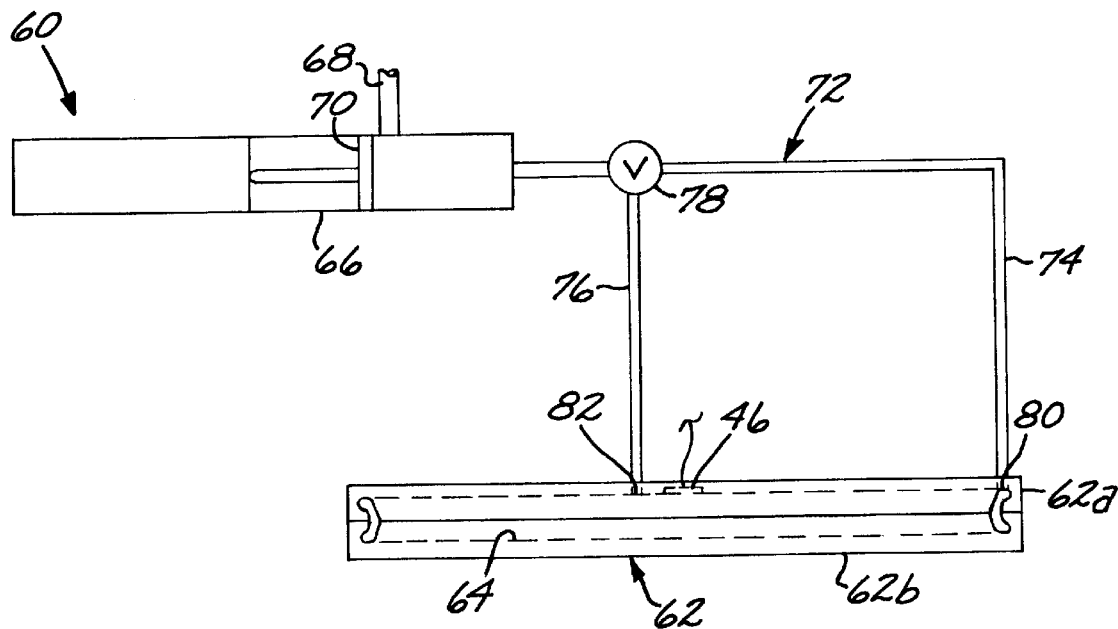
FIG. 5 is a schematic depiction of an injection molding apparatus.

FIG. 4 sets forth the sequence of steps in the manufacture of the frame 26 and throat 28 by injection molding, the preferred manufacturing approach. FIG. 5 schematically illustrates the preferred injection molding apparatus. An injection molding apparatus 60 is provided, numeral 50. The injection molding apparatus 60 includes a water-cooled injection mold 62 having a mold cavity 64 that defines the exterior shape of the frame 26 and the throat 28. The mold 62 is a split mold having two major sections 62a and 62b, as well as other elements to define the holes 32 and other features of the racket and throat. The construction of such split molds is known in the art.

An injection molding material is injected into the mold cavity from an injection molding extruder 66. Briefly, the starting material is supplied through an inlet tube 68 to the interior of the extruder 66, which is heated so that the starting material is in a flowable state. A piston or screw 70 is initially in the retracted position. During injection, the piston 70 moves forwardly (to the right in FIG. 5), forcing the flowable starting material out of the extruder 66 and into a hot manifold system 72.

In the present case, the hot manifold system 72 provides for two flow paths 74 and 76 for the flowable starting material, for reasons to be discussed subsequently. A valve 78 controls the relative flow or absence of flow in the two flow paths 74 and 76. The first flow path 74 leads to a first injection port 80 into the mold cavity 64, and the second flow path 76 leads to a second injection port 82 into the mold cavity 64. Equivalently, the flows to the injection ports 80 and 82 may be accomplished by two separate extruders, so that no valving is required.

The locations of the injection ports 80 and 82 relative to the frame 26 and the throat 28 may be seen more clearly in FIG. 1. The generally oval frame 26 (when viewed in plan view) has a first end 40 remote from the throat 28, and a second end 42 integral with the throat. The first injection port 80 is in communication with the mold cavity 64 at the first end 40 of the frame 26. The second injection port 82 is in communication with the mold cavity 64 in the region of the throat 28.

Figure 6:
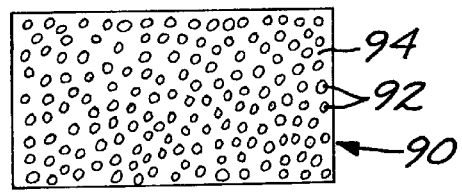
FIG. 6 is a schematic depiction of the microstructure of a fiber-reinforced thermoplastic resin material.

The material of construction of the frame 26 and the throat 28 is provided, fed into the injection molding apparatus 60, and injected into the mold cavity 64 using the apparatus 60. The material of construction is a fiber-reinforced thermoplastic resin material 90 such as shown in FIG. 6. The material 90 includes long fibers 92, preferably greater than about ½ inch in length, embedded in a thermoplastic resin matrix 94. The fibers may be of any operable material, with graphite, carbon, glass, and aramid (Kevlar™ fibers) preferred. The flowable matrix material is a thermoplastic resin, that is, one which is solid at room temperature and becomes flowable at a sufficiently elevated temperature. A preferred thermoplastic resin is polypropylene, but other operable thermoplastic resins include PVC (Poly(Vinyl Chloride)), ABS (Acrylonitrile-Butadiene-Styrene), and polystyrene.

Figure 7:
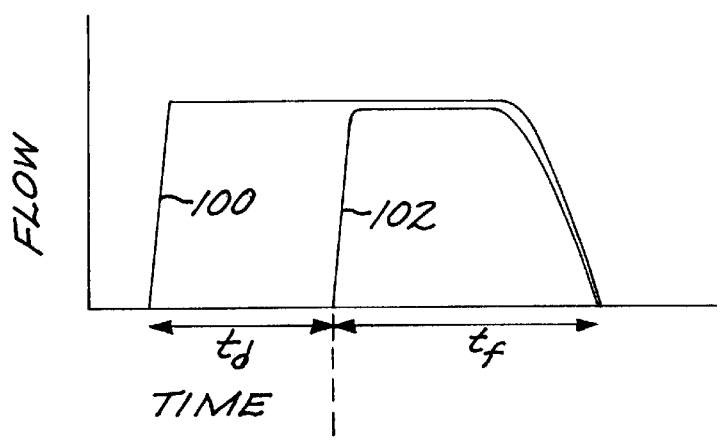
FIG. 7 is a graph of injection molding flow as a function of time.
Figure 8:
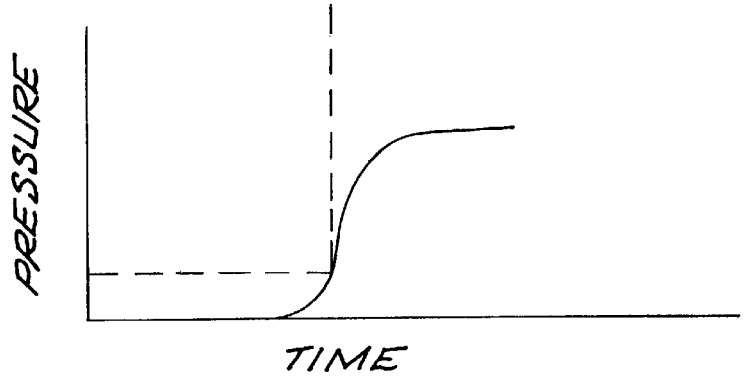
FIG. 8 is a graph of pressure as a function of time after commencement of the first injection.

The injection of the flowable fiber-reinforced thermoplastic resin is performed in two stages, the second commencing after the first has started. The flows and timing of the two stages are illustrated in FIGS. 7 and 8. In a first injection, numeral 52, the valve 78 is set to inject the flowable fiber-reinforced thermoplastic resin only through the first flow path 74 and into the first injection port 80, see line 100 of FIG. 7. The injected material flows from the first injection port 80 in the first end 40 of the frame 26 and through the mold cavity 64 in the circumferential directions indicated by the lines 44 in FIG. 1. This flow causes the fibers in the injected material to align generally circumferentially. The progress of the flow of the injected material in the direction of the lines 44 is most preferably monitored by a pair of pressure sensors 46 extending into the mold cavity 64 at either side of the second end 42 of the frame 26. FIG. 7 shows the pressure as measured by one of these sensor 46 as a function of time after the start of the first injection molding, numeral 52. The pressure is initially low, but then rises rapidly as the flow of injected material reaches the second end 42 of the frame 26.

When the flow of injected material reaches the second end 42 of the frame 26, as established by some predefined increase in the pressure value, the valve 78 is operated so that injected material flows through the second flow path 76, numeral 54 and line 102 of FIG. 7, as well as the first flow path 74. The injected material flowing through second flow path 76 enters the mold cavity 64 through the second injection port 82 and into the throat 28. The flow of material is continued until the mold cavity is filled, thereby defining the frame and the throat of the finished racket.

The time delay $t_d$ between the commencement of the flow into the first injection port 80, line 100 of FIG. 7, and the commencement of the flow into the second injection port 82, line 102 of FIG. 7, depends upon several factors, such as the injection pressure, the viscosity of the injected material, and the dimensions of the mold cavity. However, in a typical case, the time $t_d$ is from about 1 to about 2 seconds. The valve 78 is immediately opened, and the flow begins in the second flow path 76. In an example of the timing, where $t_d$ is 1.5 seconds, the flow in the second flow path 76 is established at about 1.7 seconds. The joint flow in the two flow paths 74 and 76 continues until the mold cavity is filled, which usually occurs at about 1.8 to about 3 seconds after the commencement of the flow in the first flow path 74. Following conventional injection molding practice, the pressure in the mold cavity is sustained for up to another 25–30 seconds while the injected material is allowed to cool in contact with the water-cooled mold 62, and at that point the mold halves 62a and 62b are separated and the molded article is ejected.

The two-stage injection process, numerals 52 and 54, is performed to ensure that the two flows of flowable material, injected through the ports 80 and 82, meet and mix within the throat region 28 rather than in the frame region 26. At the location where the flows meet within the large-sized throat region 28, there is a swirling motion of the flows as they intermix. This swirling motion ensures good mixing of the two injected flows and the fibers in the flows, and prevents the occurrence of a plane of weakness. If, on the other hand, the flows were to meet in the relatively confined section of the frame 26, there is little opportunity to achieve a swirling effect and the flows meet along an interface. This interface becomes a plane of potential weakness in the final product that may lead to premature failure of the racket during service.

To complete the fabrication of the racket 20, the handle (not shown) is attached, numeral 56, and the racket is strung, numeral 58.

Figure 9:
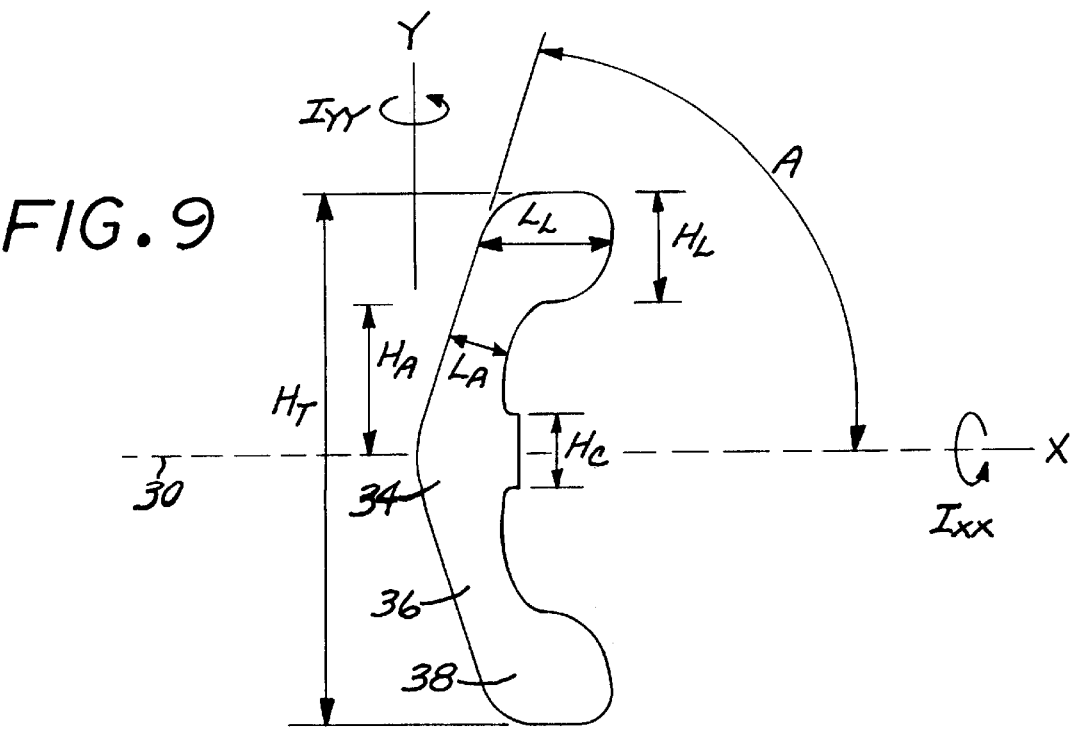
FIG. 9 is a detail of the preferred cross sectional shape of the racket frame of FIG. 3.

FIG. 9 illustrates a most-preferred cross-sectional shape for the frame 26, in the form of a tennis racket frame. This shape and its dimensions were determined by optimizing the geometry of the cross-sectional shape, within the weight constraints imposed by the nature of the tennis racket and the requirements of tennis players. Referring to FIG. 9, the section moment of inertia $I_{xx}$ (and associated stiffness $EI_{xx}$, where E is the elastic modulus) must be sufficiently large to resist expected bending forces imposed when the player strikes the ball (or other object). The section moment of inertia $I_{yy}$ (and associated stiffness $EI_{yy}$) must be sufficiently large to resist the forces imposed when the racket is strung. The values of the moments of inertia for any candidate section may be found using conventional mechanics procedures and employing numerical analysis techniques for irregular shapes. The basic calculational relationships are $I_{xx} = \int y^2 dA$ and $I_{yy} = \int x^2 dA$.

The limits of the integrals are determined by the total volume of material that is available for use in the racket frame. The total amount of material available is limited by the constraint that the total weight of the racket cannot exceed a predetermined value, typically 9–12 ounces for the entire racket. The available volume of material is the constrained weight divided by the density of the material of construction. A composite material of long fibers embedded in a thermoplastic matrix is selected for the material of construction because its modulus-to-density ratio is relatively high, thereby permitting a relatively large volume of material to be used within the total weight constraint, and also because this material may be injection molded in order to achieve a low-cost racket construction. In the case of the preferred glass fiber/polypropylene composite material of construction, the density is about 1.34, leading to an available cross-sectional area of about 0.2 square inches. This available area must be allocated into a selected shape so as to provide the necessary $I_{yy}$ and as large a value of $I_{xx}$ as possible. The section shape shown in FIG. 9, which is somewhat similar to the cross-sectional shape of a wing nut, was selected to meet these objectives.

The following are nominal dimensions determined by the above-discussed procedure for the cross-sectional shape of FIG. 9. The cross-sectional area is about 0.198 square inches. The cross section has a total height $H_T$ of about 1.025 inches, and is symmetric about the centerline 30. The angle A between the arm 36 and the centerline 30 is about 72 degrees. The height of the central body, Hc, is about 0.15 inches. The length of the arm 36 to the point where the lobe 38 commences, $H_A$, is about 0.294 inches. The width of the arm, its web thickness, at a point halfway along its length, $L_A$, is about 0.129 inch. The lobe 38 itself has a height, $H_L$, of about 0.220 inch, and a width $L_L$ of about 0.272 inch.

This most preferred design has several advantages. First, the entire cross section is solid, as distinct from hollow tubular. The solid design is more robust than the hollow tubular design, because there are no thin walls, and more easily fabricated, because there is no core to be accounted for during manufacturing by injection molding. The design places a large fraction, about 54 percent by weight, of the mass of the frame into the lobes 38, which serve as integral hoops to impart high torsional stiffness to the frame. The web thickness $L_A$ is kept sufficiently large, however, so that the racket cannot be readily damaged by day-to-day use and impacts upon its rim.

Having selected this sectional shape, the manufacturing processing was optimized with the staged and sequenced injection molding procedure described previously, in order to achieve mixing of the injected flows and avoid any occurrence of planes of weakness in the final racket product.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a racket frame and throat, comprising the steps of:
    furnishing an injection mold having a mold cavity defining the shape of a racket frame and throat, the mold cavity comprising
        an oval frame region having a first end and a second end,
        a throat region integral with the second end of the oval frame region,
        a first injection port at the first end, and
        a second injection port in the throat region;
    first injecting a first quantity of a first fiber-reinforced thermoplastic resin into the first injection port, and
    second injecting a second quantity of a second fiber-reinforced thermoplastic resin into the second injection port,
wherein the first quantity and the second quantity are together sufficient to fill the mold cavity.

2. The method of claim 1, wherein the step of second injecting includes the step of
    second injecting the second fiber-reinforced thermoplastic resin of the same composition as the first fiber-reinforced thermoplastic resin.

3. The method of claim 1, wherein the step of second injecting includes the step of
    commencing the step of second injecting at a time after the step of first injecting is commenced, so that a first flow of the first quantity of the first fiber-reinforced thermoplastic resin meets a second flow of the second quantity of the second fiber-reinforced thermoplastic resin in the throat region.

4. The method of claim 1, wherein the step of second injecting includes the step of
    commencing the step of second injecting at a time of from about 1 to about 2 seconds after the step of first injecting is commenced.

5. The method of claim 1, wherein the step of furnishing an injection mold includes the step of
    providing a mold cavity having a pressure sensor at a location at which the oval frame region joins the throat region.

6. The method of claim 5, wherein the step of second injecting includes the step of
    monitoring the pressure sensor, and
    commencing the step of second injecting when the pressure measured by the pressure sensor rises to indicate that the first fiber-reinforced thermoplastic resin has flowed along the oval frame region of the mold cavity and reached the pressure sensor.

7. The method of claim 5, wherein the step of second injecting includes the step of
    commencing the step of second injecting at a preselected time after the step of first injecting is commenced.

8. The method of claim 1, wherein the step of furnishing an injection mold includes the step of
    furnishing the mold cavity with the oval frame region having no insert therein.

9. The method of claim 1, wherein the step of furnishing an injection mold includes the step of
    furnishing the mold cavity wherein the mold cavity defines the oval frame region having a cross section comprising
        a central solid body at a planar centerline of the frame, and
        two solid arms extending outwardly from the solid body, one arm above and one arm below the planar centerline of the frame.

10. The method of claim 9, wherein the step of furnishing an injection mold includes the step of
    furnishing the mold cavity with the oval frame region having an enlarged volume defining an oval hoop at a distal end of each of the solid arms.

11. The method of claim 1, wherein the step of furnishing an injection mold includes the step of
    furnishing the mold cavity wherein the mold cavity defines the oval frame region having a cross section comprising
        a central solid body at a planar centerline of the frame, and two solid arms extending outwardly from the solid body at an angle to the planar centerline of the frame of from about 70 degrees to about 80 degrees, one arm above and one arm below the planar centerline of the frame.

12. The method of claim 11, wherein the step of furnishing an injection mold includes the step of
    furnishing the mold cavity with the oval frame region having an enlarged volume defining an oval hoop at a distal end of each of the solid arms.

13. A method for preparing a racket frame and throat, comprising the steps of:
    furnishing an injection mold having a mold cavity defining the shape of a racket frame and throat, the mold cavity comprising
        an oval frame region having a first end and a second end, the oval frame region defining a cross-sectional shape having a central solid body at a planar centerline of the frame, and two solid arms extending outwardly from the solid body at an angle to the planar centerline of the frame of from about 70 degrees to about 80 degrees, one arm above and one arm below the planar centerline of the frame,
        a throat region integral with the second end of the oval frame region,
        a first injection port at the first end, and
        a second injection port in the throat region;
    first injecting a first quantity of a fiber-reinforced thermoplastic resin into the first injection port, and
    second injecting a second quantity of the fiber-reinforced thermoplastic resin into the second injection port, wherein the step of second injecting includes the step of commencing the step of second injecting at a time after the step of first injecting is commenced,
wherein the first quantity and the second quantity are together sufficient to fill the mold cavity.

14. The method of claim 13, wherein the step of furnishing an injection mold includes the step of
    furnishing the mold cavity with the oval frame region having an enlarged volume defining an oval hoop at a distal end of each of the solid arms.

15. The method of claim 13, wherein the step of second injecting includes the step of
    commencing the step of second injecting at a time of from about 1 to about 2 seconds after the step of first injecting is commenced.

16. The method of claim 13, wherein the step of furnishing an injection mold includes the step of
    providing a mold cavity having a pressure sensor at a location at which the oval frame region joins the throat region, and wherein the step of second injecting includes the step of monitoring the pressure sensor, and commencing the step of second injecting when the pressure measured by the pressure sensor rises to indicate that the first fiber-reinforced thermoplastic resin has flowed along the oval frame region of the mold cavity and reached the pressure sensor.

17. The method of claim 13, wherein the step of first injecting includes the step of providing a fiber-reinforced thermoplastic resin wherein the fiber is selected from the group consisting of graphite, carbon, aramid, and glass.

18. The method of claim 13, wherein the step of first injecting includes the step of providing a fiber-reinforced thermoplastic resin wherein the thermoplastic resin is polypropylene.

* * * * *